(12) United States Patent
Kim et al.

(10) Patent No.: US 12,332,705 B2
(45) Date of Patent: Jun. 17, 2025

(54) ELECTRONIC DEVICE FOR TEMPERATURE COMPENSATION AND METHOD FOR OPERATION THEREOF

(71) Applicant: SAMSUNG ELECTRONICS CO., LTD., Suwon-si (KR)

(72) Inventors: Jinkyu Kim, Suwon-si (KR); Hyeokseon Yu, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 22 days.

(21) Appl. No.: 17/748,680

(22) Filed: May 19, 2022

(65) Prior Publication Data

US 2023/0077919 A1    Mar. 16, 2023

Related U.S. Application Data

(63) Continuation of application No. PCT/KR2022/005209, filed on Apr. 11, 2022.

(30) Foreign Application Priority Data

Sep. 8, 2021    (KR) .................. 10-2021-0119972

(51) Int. Cl.
*G06F 1/20* (2006.01)
*G06F 1/08* (2006.01)
(Continued)

(52) U.S. Cl.
CPC ............... *G06F 1/206* (2013.01); *G06F 1/08* (2013.01); *G06F 1/1616* (2013.01);
(Continued)

(58) Field of Classification Search
CPC .......... G06F 1/08; G06F 1/206; G06F 1/1641; G06F 1/1652; G06F 1/1677;
(Continued)

(56) References Cited

U.S. PATENT DOCUMENTS 7,461,272 B2 * 12/2008 Rotem ................. G05D 23/20
                                                        713/300
9,983,557 B2     5/2018 Park et al.
(Continued)

FOREIGN PATENT DOCUMENTS

EP        2990907 A2 *  3/2016  ........... G05B 13/026
JP    2010-152740 A     7/2010
(Continued)

OTHER PUBLICATIONS

International Search Report dated Jul. 15, 2022, issued by the International Searching Authority in International Application No. PCT/KR2022/005209 (PCT/ISA/210).
(Continued)

*Primary Examiner* — Glenn A. Auve
(74) *Attorney, Agent, or Firm* — Sughrue Mion, PLLC

(57) ABSTRACT

An electronic device according to various embodiments may include: a temperature sensor; a sensor unit; and at least one processor. The at least one processor may be configured to determine that a temperature value detected by the temperature sensor exceeds a temperature threshold value; determine whether a condition is satisfied, the condition being related to at least one of a flexible state of the electronic device, whether a cover case is mounted on the electronic device, or a distance between a user's contact position on the electronic device and a position of the at least one processor; based on the condition being satisfied, operate according to a first clock level corresponding to the temperature value; and based on the condition not being satisfied, operate according to a second clock level higher than the first clock level.

19 Claims, 13 Drawing Sheets

(51) Int. Cl.
*G06F 1/16* (2006.01)
*G06F 1/3206* (2019.01)
*G06F 1/324* (2019.01)

(52) U.S. Cl.
CPC .......... *G06F 1/1641* (2013.01); *G06F 1/1652* (2013.01); *G06F 1/1677* (2013.01); *G06F 1/3206* (2013.01); *G06F 1/324* (2013.01); *H04M 2250/12* (2013.01); *Y02D 10/00* (2018.01)

(58) Field of Classification Search
CPC ...... G06F 1/3206; G06F 1/324; G06F 1/1616; Y02D 10/00; H04M 2250/12
See application file for complete search history.

(56) References Cited

U.S. PATENT DOCUMENTS

| | | | |
|---|---|---|---|
| 10,210,975 B1* | 2/2019 | Ji | H01F 7/0205 |
| 11,262,820 B1* | 3/2022 | North | G06F 1/3296 |
| 11,366,486 B2* | 6/2022 | Jung | G06F 3/0482 |
| 2010/0094582 A1 | 4/2010 | Cox et al. | |
| 2010/0142291 A1 | 6/2010 | Joo et al. | |
| 2010/0169039 A1 | 7/2010 | Hosokawa | |
| 2010/0235012 A1* | 9/2010 | Cox | G06F 1/1677 706/46 |
| 2014/0091624 A1 | 4/2014 | Park et al. | |
| 2014/0266405 A1 | 9/2014 | Barnes et al. | |
| 2014/0326518 A1 | 11/2014 | Amundsen et al. | |
| 2016/0062423 A1* | 3/2016 | Kim | H04M 1/7246 713/320 |
| 2016/0116952 A1 | 4/2016 | Lee et al. | |
| 2017/0102676 A1 | 4/2017 | Park et al. | |
| 2017/0235355 A1* | 8/2017 | Alshinnawi | G06F 1/1677 713/323 |
| 2019/0155347 A1 | 5/2019 | Ishii et al. | |
| 2020/0110451 A1 | 4/2020 | He et al. | |
| 2021/0240165 A1 | 8/2021 | Noh et al. | |
| 2021/0240294 A1 | 8/2021 | Ko et al. | |
| 2021/0247823 A1* | 8/2021 | Bang | G06F 1/3215 |
| 2022/0221830 A1* | 7/2022 | Noh | G06F 1/3206 |

FOREIGN PATENT DOCUMENTS

| | | |
|---|---|---|
| JP | 2010-193355 A | 9/2010 |
| JP | 2010-251924 A | 11/2010 |
| JP | 2016-121985 A | 7/2016 |
| JP | 2019-95948 A | 6/2019 |
| KR | 10-2010-0072114 A | 6/2010 |
| KR | 10-2016-0016181 A | 2/2016 |
| KR | 10-2038427 B1 | 10/2019 |
| KR | 10-2019-0124009 A | 11/2019 |
| KR | 10-2019-0127306 A | 11/2019 |
| KR | 10-2020-0064573 A | 6/2020 |

OTHER PUBLICATIONS

Written Opinion dated Jul. 15, 2022, issued by the International Searching Authority in International Application No. PCT/KR2022/005209 (PCT/ISA/237).

Extended European Search Report dated Aug. 27, 2024 in Application No. 22 86 7484.

* cited by examiner

ELECTRONIC DEVICE FOR TEMPERATURE COMPENSATION AND METHOD FOR OPERATION THEREOF

CROSS-REFERENCE TO RELATED APPLICATION(S)

This application is a bypass continuation application of an International Patent Application No. PCT/KR2022/005209, filed on Apr. 11, 2022, which is based on and claims priority to Korean Patent Application No. 10-2021-0119972, filed on Sep. 8, 2021 in the Korean Intellectual Property Office, the disclosures of which are incorporated by reference herein in their entireties.

BACKGROUND

1. Field

Various embodiments of the disclosure relate to an electronic device for performing temperature compensation and a method for operating the same.

2. Description of Related Art

Various services and additional functions provided through electronic devices, for example, portable electronic devices such as smartphones, are gradually increasing. In order to improve usability of such electronic devices and to satisfy various user demands, communication service providers or electronic device manufacturers are competitively developing electronic devices to provide various functions and to differentiate themselves from others. As a result, the level of various functions provided through electronic devices are becoming higher.

An electronic device, when operating at a high clock speed, may provide the user with a high performance, but this may pose a problem such as battery consumption or heating. The electronic device may adjust hardware performance such as the clock speed according to a temperature compensation algorithm for heating control. For example, the temperature compensation algorithm may detect the temperature related to an element (for example, a processor or a battery) of the electronic device and, if the temperature reaches a given temperature threshold value, may shut down the processor or decrease the clock speed, thereby minimizing the heating.

A temperature compensation algorithm of an electronic device, which is based on decreasing a clock speed, may degrade the performance of the electronic device. However, the temperature compensation algorithm is applied despite performance degradation in order to avoid user inconvenience caused by heating. On the other hand, if various conditions for performing the temperature compensation are considered based on the characteristics of the electronic device, the user may use the electronic device with a better performance (for example, clock speed) while not being affected by heating.

For example, in one scheme of the temperature compensation algorithm, if the processor temperature reaches 80°, the electronic device may decrease the clock speed for the processor and, if the temperature is above 85°, may shut down the processor. However, in various situation such as, for example, if the electronic device is a flexible device and is in an open state (or an unfolded state), if a cover case is mounted thereon, and/or according to the manner in which the user grips the electronic device, the user may not sensitively react to the processor temperature. If the same temperature compensation algorithm is nevertheless applied without considering characteristics and/or state of the electronic device, a problem may occur in that the clock speed of the processor is unnecessarily limited regardless of degree of heating sensed by the user.

For example, if the electronic device is a flexible device, and if the same temperature compensation condition is used to compensate for the temperature without considering the flexible state (e.g., a folded state of an unfolded state) of the electronic device, the clock may be unnecessarily limited. Based on whether a cover case is mounted on the electronic device, and/or according to the manner in which the user grips the electronic device, a processor temperature at which the user feels inconvenienced may be different, but if temperature compensation is performed without considering such conditions, the performance of the electronic device may be degraded by unnecessary clock limitation.

An electronic device and a method for operating the same according to various embodiments may apply a temperature compensation algorithm of the electronic device by considering at least one of a flexible state of the electronic device, a state regarding whether a cover is mounted or not, or the manner in which the user grips the same.

An electronic device and a method for operating the same according to various embodiments may loosen clock speed limitation for heating control of the electronic device, based on at least one of a flexible state of the electronic device, a state regarding whether a cover is mounted or not, or the manner in which the user grips the same.

SUMMARY

An electronic device according to various embodiments may include: a temperature sensor; a sensor unit; and at least one processor operatively connected to the temperature sensor and the sensor unit, wherein the at least one processor is configured to identify that a temperature value detected by the temperature sensor exceeds a temperature threshold value; determine whether a condition is satisfied, the condition being related to at least one of a flexible state of the electronic device, whether a cover case is mounted on the electronic device, or a distance between a user's contact position with respect to the electronic device and a position at which the at least one processor is positioned in the electronic device; based on the condition being satisfied, operate according to a first clock level corresponding to the temperature value for heating control; and based on the condition not being satisfied, operate according to a second clock level higher than the first clock level.

An operation method of an electronic device according to various embodiments may include identifying that a temperature value detected by a temperature sensor included in the electronic device exceeds a temperature threshold value; determining whether a condition is satisfied, the condition being related to at least one of a flexible state of the electronic device, whether a cover case is mounted on the electronic device, or a distance between a user's contact position with respect to the electronic device and a position at which at least one processor is positioned in the electronic device; based on the condition being satisfied, driving the at least one processor according to a first clock level corresponding to the temperature value for heating control; and based on the condition not being satisfied, driving the at least one processor according to a second clock level higher than the first clock level.

An electronic device and a method for operating the same according to various embodiments may operate the electronic device at a higher clock speed while performing heat control than related art temperature compensation conditions, according to the operating state of the electronic device, and may maximize usability.

An electronic device and a method for operating the same according to various embodiments may apply a temperature compensation algorithm that utilizes conditions such as a screen size of a flexible device, whether a cover case is mounted or not, or a difference in the gripping manner of a user, thereby minimizing performance degradation of a processor due to temperature compensation, and providing the user with a better processing environment.

BRIEF DESCRIPTION OF THE DRAWINGS

The above and other aspects, features, and advantages of various embodiments of the disclosure will be more apparent from the following description taken in conjunction with the accompanying drawings, in which.

DETAILED DESCRIPTION

Figure 1:
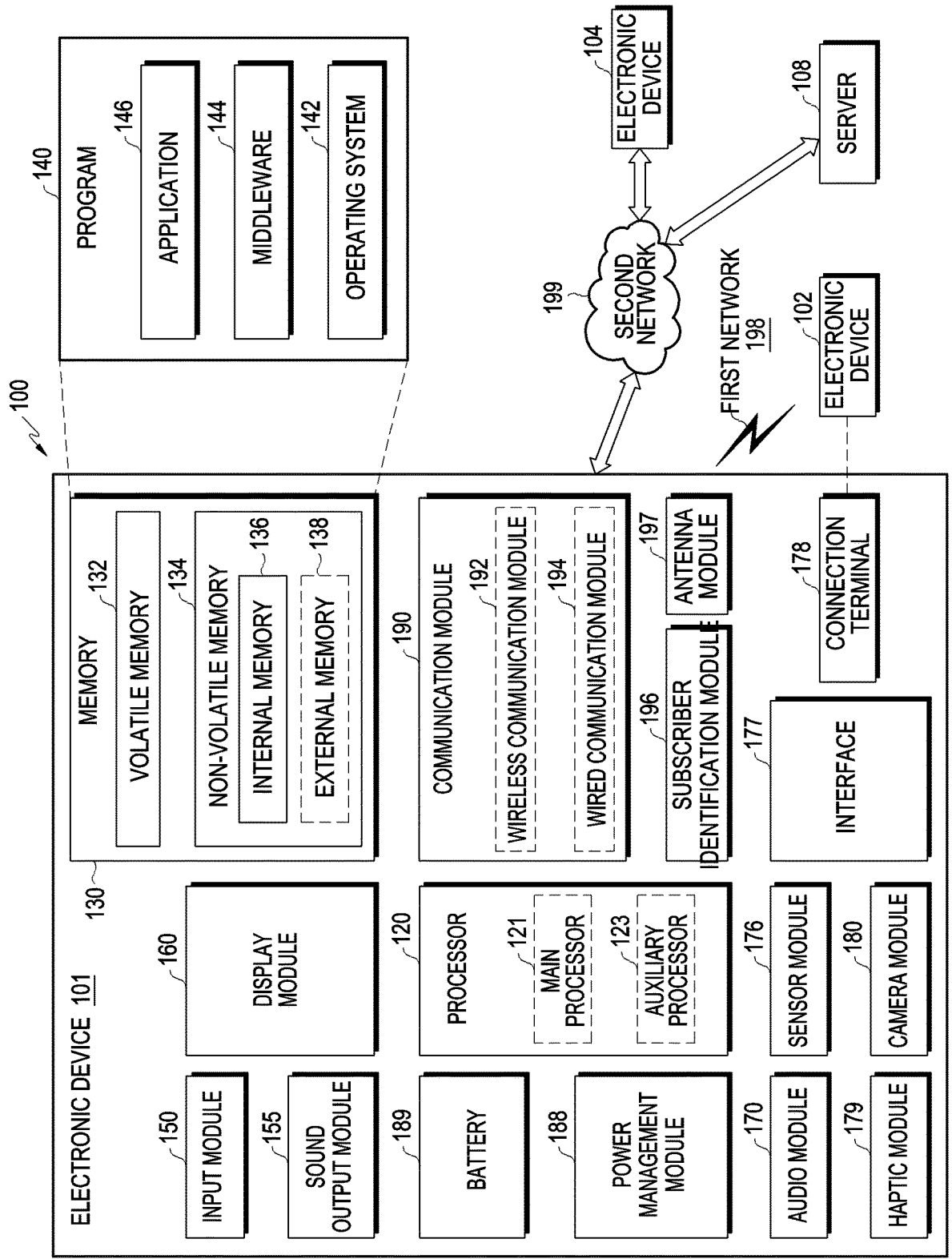
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
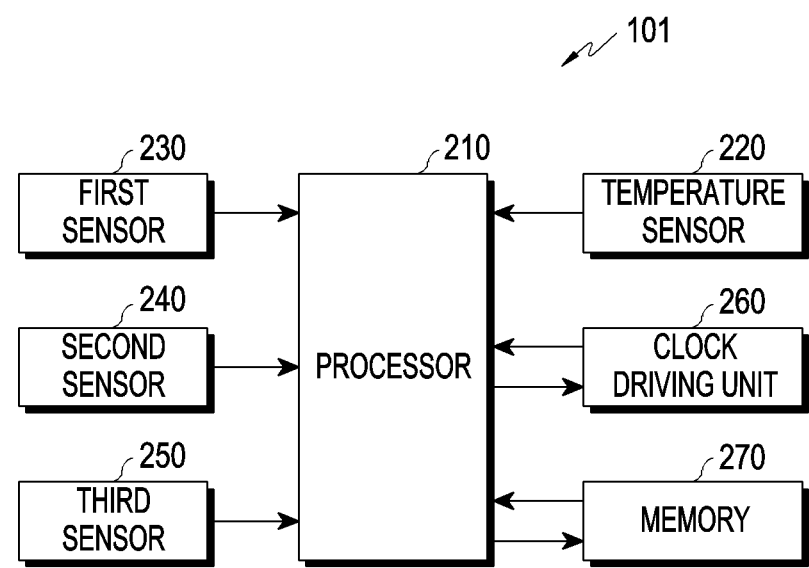
FIG. 2 is a block diagram of an electronic device according to various embodiments.

FIG. 2 is a block diagram of an electronic device 101 according to various embodiments.

Referring to FIG. 2, the electronic device 101 may include at least one of a processor 210, a temperature sensor 220, a clock driving unit 260, or a memory 270. The electronic device 101 may further include a sensor unit including at least one of a first sensor 230, a second sensor 240, or a third sensor 250. According to an embodiment, the electronic device 101 may further include at least one component among the components illustrated in FIG. 1. According to various embodiments, the electronic device 101 may be a portable electronic device which includes a processing unit and a temperature sensor and may be carried by a user, such as a smart phone or a tablet computer, and an example thereof is not limited. The electronic device 101 may include at least a part of the configuration and/or function of the electronic device 101 of FIG. 1.

According to an embodiment, the processor 210 may include at least one processing unit among processors (e.g., the main processor 121 or the coprocessor 123) in the processor 120 of FIG. 1, for example, at least one of a central processing unit (CPU), an application processor (AP), or a graphic processing unit (GPU). The processor 210 may be operatively and/or electrically connected to at least one of the temperature sensor 220, the memory 270, and the clock driving unit 260. The processor 210 may also be operatively and/or electrically connected to at least one of the first sensor 230, the second sensor 240, or the third sensor 250, and control the performance of the processor 210 configured to drive the electronic device 101 according to an internal and/or external situation of the electronic device 101. In an embodiment, the processor 210 may select one of a plurality of clock levels according to a given temperature compensation algorithm, and operate (for example, execute at least one application) by using the selected one clock level. The processor 210 may change a clock level according to an internal and/or external situation (for example, the current temperature) of the electronic device 101 during operation. The plurality of clock levels may be discrete values, continuous values, or values within a given range.

The temperature compensation algorithm relates to a policy for determining a clock speed during operation of the processor 210 and, for example, may include an operation of increasing or decreasing a clock level for the processor 210 according to an internal and/or external temperature of the electronic device 101. According to an embodiment, the processor 210 may select a clock level according to a processor temperature (for example, an AP temperature or a CPU temperature) in the electronic device 101.

For example, in a case where the processor temperature is within a first temperature range (e.g., a lower limit of the range being greater than 60° C.), the processor 210 may operate by using one clock level (for example, a clock level lower than the clock level currently used by the processor 210) corresponding to the first temperature range among the plurality of clock levels according to the given temperature compensation algorithm. For example, in a case where the processor temperature is within a second temperature range (e.g., a lower limit of the range being greater than 70° C.), the processor 210 may operate by using one clock level (for example, a clock level lower than the clock level currently used by the processor 210 or a clock level lower than the clock level corresponding to the first temperature range) corresponding to the second temperature range among the plurality of clock levels according to the given temperature compensation algorithm. For example, in a case where the external temperature is within a third temperature range (e.g., a lower limit of the range being greater than 80° C.), the processor 210 may operate by using one clock level (for example, a clock level lower than the clock level currently used by the processor 210 or a clock level lower than the clock level corresponding to the second temperature range) corresponding to the third temperature range according to the given temperature compensation algorithm.

According to various embodiments, the clock driving unit 260 may provide, to the processor 210, a clock signal having a clock level determined according to the control of the processor 210. Information on the plurality of clock levels which may be provided by the clock driving unit 260 may be stored in the memory 270. The clock driving unit 260 may provide, to the processor 210, a clock signal according to a clock level provided from the processor 210 among the plurality of clock levels.

An example of the plurality of clock levels which are stored in the memory 270 and may be selected by the processor 210 according to various embodiments is shown in <Table 1> below.

TABLE 1

| Level | CPU | GPU |
|---|---|---|
| L0 | 2.8 GHz | 800 MHz |
| L1 | 2.5 GHz | 700 MHz |
| L2 | 2.3 GHz | 600 MHz |
| L3 | 2.0 GHz | 500 MHz |
| L4 | 1.8 GHz | 400 MHz |
| L5 | 1.5 GHz | 300 MHz |
| L6 | 1.2 GHz | 200 MHz |
| L7 | 1 GHz | 100 MHz |
| L8 | 800 MHz | |
| L9 | 600 MHz | |
| L10 | 500 MHz | |

Referring to <Table 1>, the processor 210 (for example, the AP) may identify, from the memory 270, a plurality of clock levels respectively corresponding to at least one (for example, the CPU and/or GPU) of the processors included in the electronic device 101. In the example of <Table 1>, a clock speed for each clock level may be specified with respect to the CPU or GPU. The higher the clock level (that is, closer to L0), the higher the clock speed may be. In an embodiment, in a situation where temperature compensation is not required, the processor 210 may control each processor, for example, the CPU and GPU, to operate according to the highest clock speed according to the maximum clock level (e.g., L0), for example, 2.8 GHz and 800 MHz, respectively.

In an embodiment, in a situation where temperature compensation is required (for example, a high temperature exceeding a temperature threshold value among a plurality of temperature threshold values), the processor 210 may control each processor, for example, the CPU to operate at a clock speed according to a clock level lower than the maximum clock level, for example, one of 2.5 GHz to 500 MHz. In an embodiment, in a situation where temperature compensation is required (for example, a high temperature exceeding a temperature threshold value among a plurality of temperature threshold values), the processor 210 may control, for example, the GPU to operate at a clock speed according to a clock level lower than the maximum clock level, for example, one of 700 MHz to 100 MHz.

According to an embodiment, the temperature sensor 220 may be a temperature sensor in the sensor module 175 of FIG. 1. According to various embodiments, the temperature sensor 220 may include a sensor module configured to measure the temperature of the electronic device 101. In an embodiment, the temperature sensor 220 may include a thermistor, and the thermistor may be positioned on a main printed circuit board (PCB) on which the processor 210 and the memory 270 are disposed. In an embodiment, the processor 210 may measure an internal temperature and/or an external temperature of the electronic device 101 by using the temperature sensor 220. In an embodiment, the temperature sensor 220 may include a sensor module configured to measure each of at least one of the components of the electronic device 101.

In an embodiment, the temperature sensor 220 may include at least one of a temperature sensor module for an AP, a temperature sensor module for a battery (for example, the battery 189), a temperature sensor module for a sub-battery (for example, which may be included in the battery 189), a temperature sensor module for a USB circuit (for example, which may be included in the interface 177), a temperature sensor module for a charging circuit (for example, which may be included in the battery 189), a temperature sensor module for a direct current (DC) power circuit (for example, which may be included in the battery 189), or a temperature sensor module for a Wi-Fi communication module (for example, which may be included in the wireless communication module 192). In an embodiment, the temperature sensor 220 may include a temperature sensor module configured to identify an external temperature of the electronic device 101 or an ambient temperature of the electronic device 101.

In various embodiments, the electronic device 101 may include at least one of the first sensor 230, the second sensor 240, or the third sensor 250. At least one of the first sensor 230, the second sensor 240, or the third sensor 250 may be included in the sensor module 176 of FIG. 1.

In an embodiment, in a case where the electronic device 101 is a flexible device (for example, a foldable device, a rollable device, or a device including a flexible display), the first sensor 230 may detect a flexible state (or folding state) of the electronic device 101 and provide information on the flexible state to the processor 210. In an embodiment, in a case where the electronic device 101 is a foldable device, the flexible state (or folding state) may include one of a closed state (or a folded state) or an open state (or an unfolded state). The closed state may include a state in which both panels of the electronic device 101 are fully folded and/or a state in which the both panels are almost fully folded (for example, an angle between the both panels of the electronic device 101 is less than a first threshold value). The open state may include a state in which both panels of the electronic device 101 are fully unfolded and/or a state in which the both panels are almost fully unfolded (for example, an angle between the both panels of the electronic device 101 exceeds a second threshold value).

In an embodiment, in a case where the electronic device 101 is a rollable device, the closed state may mean a state in which the degree to which a display screen of the electronic device 101 is opened (for example, an open length or area) is less than a first threshold value, and the open state may mean a state in which the degree to which the display screen of the electronic device 101 is opened (for example, an open length or area) exceeds a second threshold value. In an embodiment, the flexible state (or the folding state) of the electronic device 101 may further include an intermediate state. The intermediate state may include a state between the closed state and the open state of the electronic device 101.

In an embodiment, the second sensor 240 may detect a state indicating whether a cover case is mounted on the electronic device 101. In a case where the cover case is mounted on the electronic device 101, the second sensor 240 may provide, to the processor 210, information indicating that the cover case is in a mounted state.

In an embodiment, the third sensor 250 may detect information on a manner of gripping the electronic device 101 and provide the information to the processor 210. In an embodiment, the third sensor 250 may include a grip sensor and an acceleration sensor. The grip sensor may detect information on whether an external object such as a user's hand or a ball is in contact with an external housing of the electronic device 101, and may provide the information to the processor 210. The acceleration sensor may detect a rotation angle (for example, an absolute angle ranging from 0 to 360) of the electronic device 101 and provide the rotation angle to the processor 210. The processor 210 may determine a manner of gripping the electronic device 101, based on the information provided from the third sensor 250. In an embodiment, the gripping manner may include whether an operation mode of the electronic device 101 is a landscape mode or a portrait mode. In an embodiment, the gripping manner may indicate how close a user's contact part (for example, a hand or cheek) is to the processor 210 of the electronic device 101, and a distance between a user's contact part and a specific component (for example, the AP) of the electronic device 101.

In various embodiments, when it is determined that a temperature value provided from the temperature sensor 220 exceeds a temperature threshold value and thus a temperature compensation algorithm needs to be performed, the processor 210 may determine to use a limited clock level (that is, a lower clock level) corresponding to the temperature value or use a higher clock level, based on information received from at least one of the first sensor 230, the second sensor 240, or the third sensor 250. The detailed descriptions of various embodiments related to the operation of the processor 210 will be described later.

According to various embodiments, the memory 270 may include a volatile memory and a non-volatile memory, but a specific implementation example is not limited thereto. The memory 270 may include at least a part of the configuration and/or function of the memory 130 of FIG. 1. In addition, the memory 270 may store at least a part of the program 140 of FIG. 1.

The memory 270 may be operatively, functionally, and/or electrically connected to the processor 210, and may store various instructions which may be executed by the processor 210. Such instructions may include control commands such as arithmetic and logical operations, data movement, and input/output which may be recognized by the processor 210.

According to various embodiments, the processor 210 may not be limited to an arithmetic operation and data processing function which may be implemented in the electronic device 101. However, various embodiments for detecting a processor temperature of the electronic device 101 and determining a clock speed based on the processor temperature will be described herein. The operations of the processor 210 to be described later may be performed by loading the instructions stored in the memory 270.

An electronic device 101 according to various embodiments may include: the temperature sensor 220, the sensor unit 230, 240, or 250, and the at least one processor 210 operatively connected to the temperature sensor 220 and the sensor unit 230, 240, or 250, wherein the at least one processor 210 is configured to identify that a temperature value detected by the temperature sensor 220 exceeds a first temperature threshold value; determine whether a condition is satisfied, the condition being related to at least one of a flexible state of the electronic device 101, whether a cover case is mounted on the electronic device 101, or a distance between a user's contact position with respect to the electronic device 101 and a position at which the at least one processor 210 is positioned in the electronic device 101, operate according to a first clock level corresponding to the temperature value for heating control based on the condition being satisfied, and operate according to a second clock level higher than the first clock level based on the condition not being satisfied.

In an embodiment, the condition may include at least one of a condition that the electronic device is a flexible device and the electronic device is in a closed state, a condition that the cover case is not mounted on the electronic device, or a condition that the distance is within a distance threshold value.

In an embodiment, the condition may include a condition that the electronic device is a flexible device and is in a closed state, the cover case is not mounted on the electronic device, and the distance is within a distance threshold value.

In an embodiment, the first clock level may be one of a plurality of clock levels configured for a central processing unit (CPU) and/or a graphic processing unit (GPU) included in the electronic device.

In an embodiment, the second clock level may be one of a plurality of clock levels configured for a central processing unit (CPU) and/or a graphic processing unit (GPU) included in the electronic device.

In an embodiment, the second clock level may be greater than the first clock level by a given value.

In an embodiment, the detected temperature value may include at least one temperature value measured for an application processor (AP) and/or a battery included in the electronic device.

In an embodiment, the temperature threshold value for executing the temperature compensation may be adjusted according to a distance between the user's contact position and the at least one processor. For example, the at least one processor is further configured to determine a second temperature threshold value based on the distance between the user's contact position and the position at which the at least one processor is positioned in the electronic device, and based on the condition being satisfied and further based on the temperature value detected by the temperature sensor exceeding the second temperature threshold value, operate according to the first clock level corresponding to the temperature value.

In an embodiment, the sensor unit may include at least one of: a first sensor configured to detect whether a flexible state of the electronic device is a closed state or an open state, a second sensor configured to detect whether the cover case is in a mounted state or an unmounted state with respect to the electronic device (e.g., whether the cover case is mounted on the electronic device or not), or a third sensor configured to detect a distance between the user's contact position and the position at which the at least one processor is positioned in the electronic device.

In an embodiment, the electronic device is a foldable device, and the flexible state may be one of a folded state and an unfolded state. In an embodiment, the electronic device is a rollable device, and the flexible state may be one of a state in which an open area of a display screen of the electronic device is less than a first threshold value and a state in which the open area of the display screen exceeds a second threshold value.

Figure 3A:
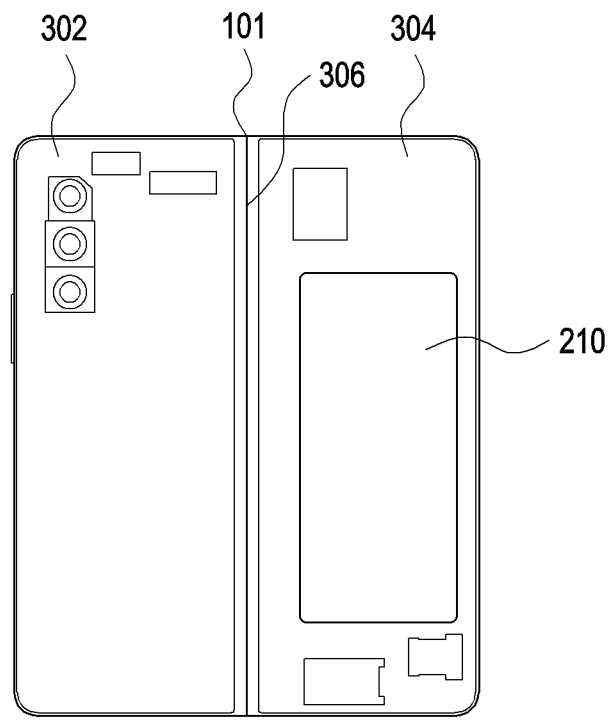
FIGS. 3A, 3B, and 3C illustrate a configuration of an electronic device implemented as a foldable device according to various embodiments.
Figure 3B:
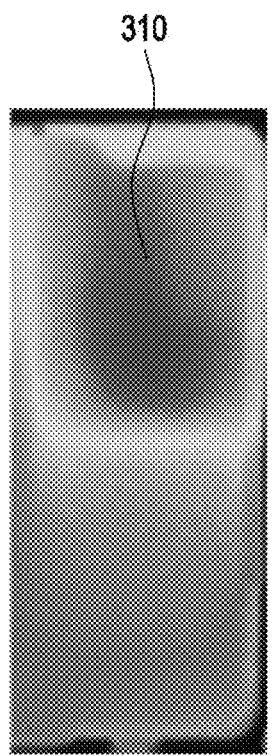
Figure 3C:
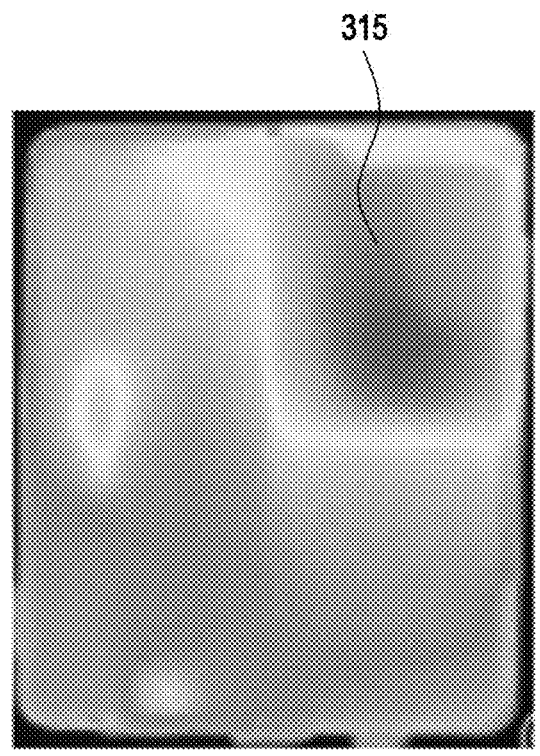

FIGS. 3A, 3B, and 3C illustrate a configuration of the electronic device 101 implemented as a foldable device according to various embodiments.

Referring to FIG. 3A, the electronic device 101 may include a first panel 302 and a second panel 304 which are foldable. The first panel 302 and the second panel 304 may be connected by a foldable connector 306, and a flexible display may be disposed on the first panel 302, the second panel 304, and the connector 306. In an embodiment, the second panel 304 may include the processor 210 (for example, an AP).

Referring to FIG. 3B, in a state in which the electronic device 101 is closed (for example, an angle between the first panel 302 and the second panel 304 is less than a first threshold value), heat 310 may be detected on the second panel 304 including the processor 210.

Referring to FIG. 3C, in a state in which the electronic device 101 is open (for example, an angle between the first panel 302 and the second panel 304 exceeds a second threshold value), heat 315 detected on the second panel 304 including the processor 210 may have a temperature lower than the heat 310 generated in a state in which the electronic device 101 is closed.

As shown in the examples of FIGS. 3B and 3C, a surface temperature may be dispersed as a display screen of the electronic device 101 implemented as a flexible device is unfolded or open. Since the surface temperature of the electronic device 101 is lowered when the surface temperature is dispersed, processing performance and usability may be improved by relaxing a temperature compensation condition (for example, including a temperature threshold value) for executing a temperature compensation algorithm in the processor 210 in a state in which the electronic device 101 is unfolded or open.

The following <Table 2> shows an example of a temperature difference between when the electronic device 101 is in a closed state and when the electronic device 101 is in an open state in a case where the electronic device 101 is a foldable device.

TABLE 2

| Items | Number of times | Closed | Open | Difference |
|---|---|---|---|---|
| AP_temp | 1 | 34.9 | 33.8 | 1.1 |
| | 2 | 36.3 | 35.3 | 1.0 |
| BAT_temp | 1 | 29.1 | 28.8 | 0.3 |
| | 2 | 29.8 | 29.7 | 0.1 |
| SUBBAT_temp | 1 | 29.0 | 29.0 | 0 |
| | 2 | 29.3 | 29.5 | −0.2 |
| USB_temp | 1 | 29.2 | 28.8 | 0.4 |
| | 2 | 29.7 | 29.6 | 0.1 |
| CHG_temp | 1 | 33.9 | 32.9 | 1.0 |
| | 2 | 35.0 | 34.2 | 0.8 |
| DC_temp | 1 | 32.9 | 31.9 | 1.0 |
| | 2 | 34.1 | 33.3 | 0.8 |
| WIFI_temp | 1 | 29.8 | 29.6 | 0.2 |
| | 2 | 30.0 | 29.9 | 0.1 |

<Table 2> shows a temperature (i.e., a Celsius temperature) measured for each component when the electronic device 101 executes a camera preview, at each of two times. AP temp may represent a temperature measured for an AP (for example, the processor 120 or which is included in the processor 210), BAT temp may represent a temperature measured for a main battery (for example, the battery 189), SUBBAT_temp may represent a temperature measured for a sub-battery (for example, which may be included in the battery 189), USB temp may represent a temperature measured for a USB circuit (for example, which may be included in the interface 177), CHG_temp may represent a temperature measured for a charging circuit (for example, which may be included in the battery 189), DC temp may represent a measured temperature for a direct current (DC) power circuit (for example, which may be included in the battery 189), and WIFI temp may represent a temperature measured for a Wi-Fi communication module (for example, which may be included in the wireless communication module 192).

As shown in <Table 2>, in a state in which the display screen of the electronic device 101 is unfolded, such as an unfolded state or an open state, it can be seen that a temperature is measured to be low even in the same operation as the surface temperature of the electronic device 101 is dispersed. In particular, it can be seen from <Table 2> that a temperature difference with respect to the AP among the components of the electronic device 101 is 1.1 degrees, which is the largest.

In various embodiments, in a case where a state of the display screen of the electronic device 101 is changed from a closed state to an open state, as a temperature is dispersed on the surface of the electronic device 101, it may take longer for an internal temperature of the electronic device 101 to reach a temperature threshold value for temperature compensation. Accordingly, the processor 210 may relieve limitation of the maximum clock level of the electronic device 101 in a state in which the display screen of the electronic device 101 is greatly opened (for example, an unfolded state or an open state). In an embodiment, in a case where the electronic device 101 is in the open state, the processor 210 may determine to use a higher maximum clock level than in a closed state under the same temperature condition. In various embodiments, relaxation of a temperature compensation condition to use a higher maximum clock level can benefit from improved processing performance and increased usability.

Figure 4A:
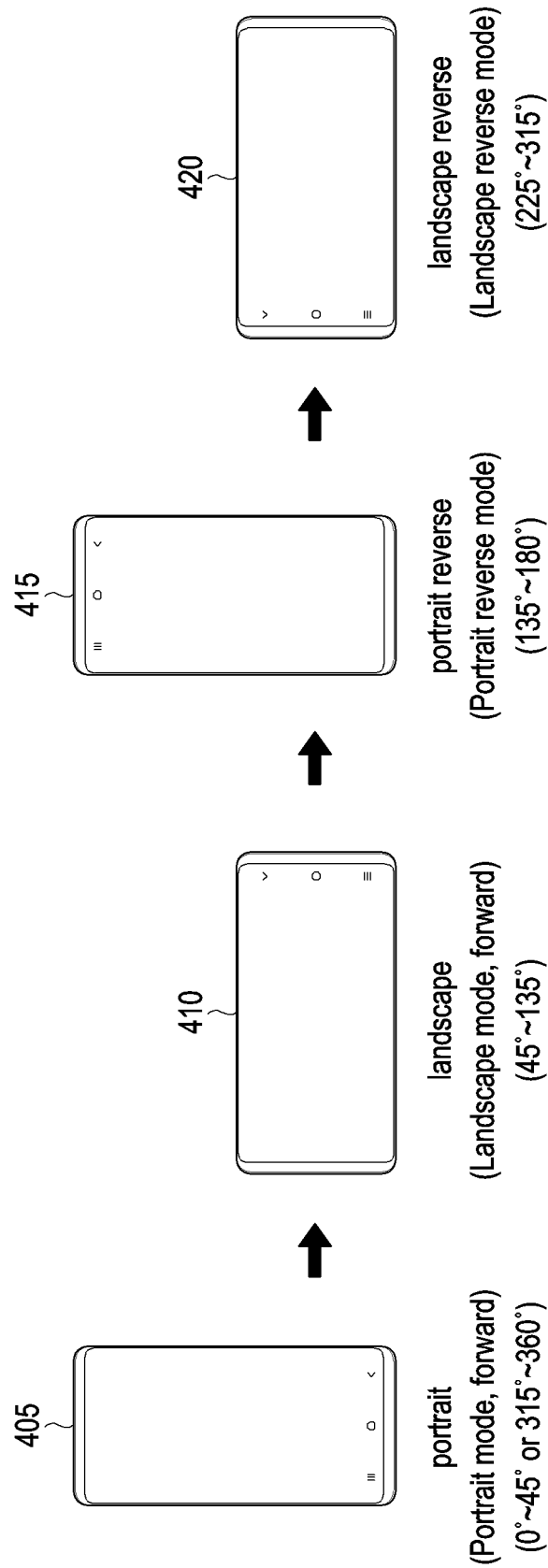
FIGS. 4A and 4B illustrate a change in a form factor according to a manner of gripping an electronic device according to various embodiments.
Figure 4B:
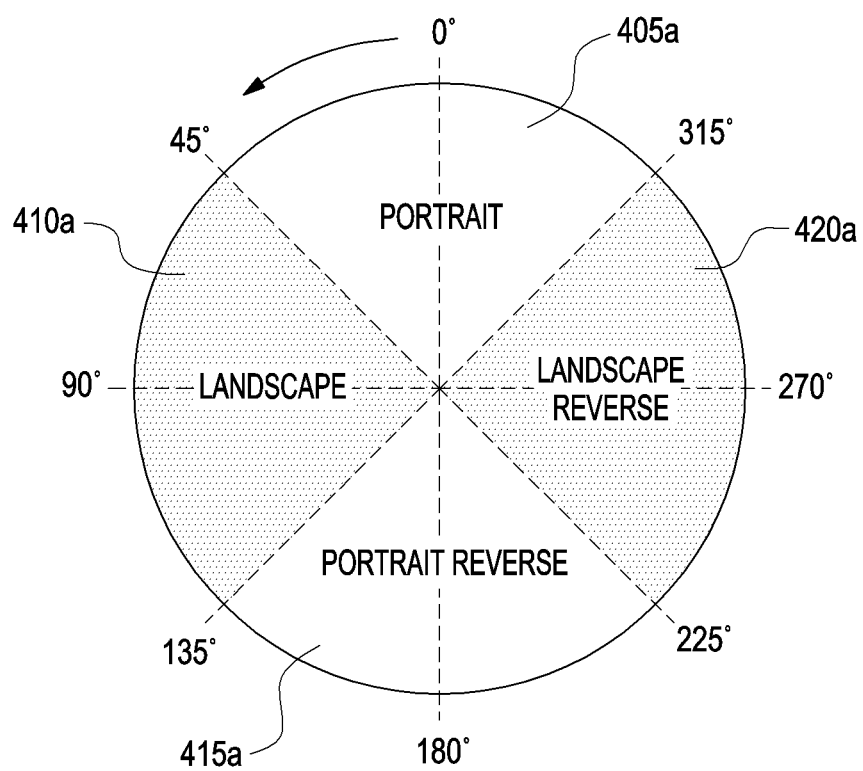

FIGS. 4A and 4B illustrate a change in a form factor according to a manner of gripping the electronic device 101 according to various embodiments. FIG. 4A illustrates four operation modes of the electronic device 101 according to a user's gripping manner, such as a portrait mode 405, a landscape mode 410, a portrait reverse mode 415, and a landscape reverse mode 420. FIG. 4B illustrates a change in a form factor of the electronic device 101 to a sensor angle measured by an acceleration sensor (for example, the sensor module 176 or the third sensor 250) of the electronic device 101.

In various embodiments, the processor 210 of the electronic device 101 may receive information on whether any of upper, lower, left, and right portions which are edges of the electronic device 101 are in contact with a user's hand from a grip sensor (for example, the sensor module 176 or the third sensor 250), and receive a rotation angle (for example, an absolute angle) from an acceleration sensor (for example, the sensor module 176 or the third sensor 250) to detect a change in the form factor of the electronic device 101.

In an embodiment, the portrait mode 405 may mean that a rotation angle detected by the acceleration sensor of the electronic device 101 is in a range 405*a* of 0 to 45 degrees or 315 to 360 degrees. In an embodiment, the landscape mode 410 may mean that a rotation angle detected by the acceleration sensor of the electronic device 101 is in a range 410*a* of 45 to 135 degrees. In an embodiment, the portrait reverse mode 415 may mean that a rotation angle detected by the acceleration sensor of the electronic device 101 is in a range 415*a* of 135 to 180 degrees. In an embodiment, the landscape reverse mode 420 may mean that a rotation angle detected by the acceleration sensor of the electronic device 101 is in a range 420*a* of 225 to 315 degrees.

As described above, a rotation angle of the acceleration sensor for each operation mode of the electronic device 101 is different, and the processor 210 may distinguish a shape of a user's grip when gripping the electronic device 101 (that is, a gripping manner), based on an operation mode of the electronic device 101 determined based on the rotation angle and information detected by the grip sensor.

Figure 5:
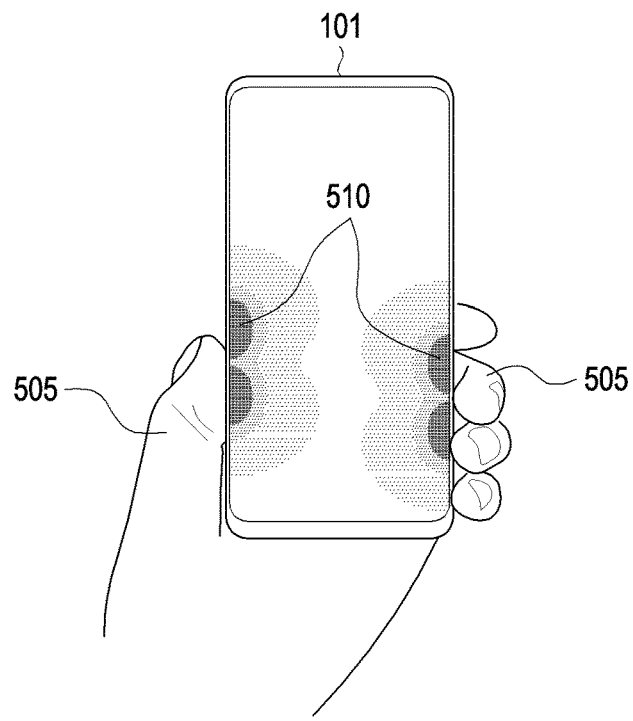
FIG. 5 is a graphic representation of detection values of a grip sensor according to gripping in various embodiments.

FIG. 5 is a graphic representation of detection values of a grip sensor according to gripping in various embodiments.

Referring to FIG. 5, two fingers 505 of a user hold lower ends 510 of both side surfaces of the electronic device 101, and values detected by a grip sensor of the electronic device 101 may indicate that the lower ends 510 of the both side surfaces are contact positions of the user with respect to the electronic device 101. In an embodiment, the processor 210 may determine a user's gripping manner, based on one of the operation modes of FIG. 4A determined by the acceleration sensor and the user's contact position detected by the grip sensor.

Figure 6A:
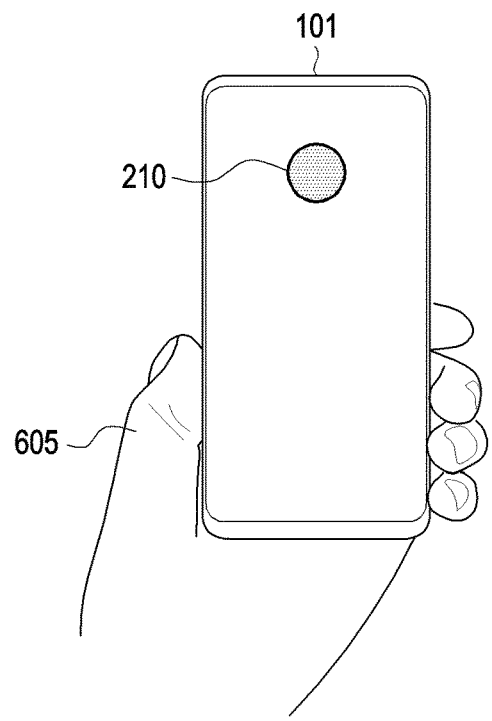
FIGS. 6A and 6B are diagrams illustrating heat propagation according to a gripping manner in various embodiments.
Figure 6B:
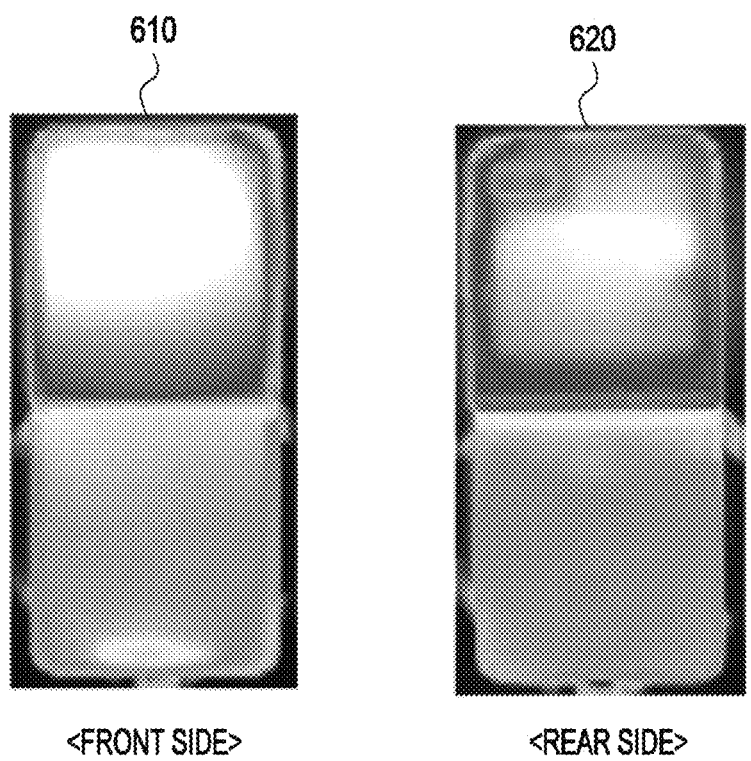

FIGS. 6A and 6B are diagrams illustrating heat propagation according to a gripping manner in various embodiments.

Referring to FIG. 6A, in an embodiment, the processor 210 (for example, an AP) may be positioned at the top of the electronic device 101. When a hand 605 of a user holds lower ends of both side surfaces of the electronic device 101, heat may be propagated with reference to a position of the processor 210 where a temperature is concentrated. Referring to FIG. 6B, heat having a higher temperature is shown at a rear upper end 620 where the processor 210 is positioned, compared to a front upper end 610 of the electronic device 101. Therefore, in a case where the user's hand holds the lower ends of both side surfaces of the electronic device 101, the user may not directly detect the heat shown at the rear upper end 620 of the processor 210. Accordingly, the processor 210 may determine not to immediately apply limitation of a clock level according to a temperature compensation algorithm, based on the gripping manner, or determine to use a clock level higher than the clock level corresponding to the current temperature detected by a temperature sensor (for example, the temperature sensor 220).

In various embodiments, in a case where the electronic device 101 is a flexible device, a gripping manner may be more diverse, and a sensory temperature felt by a user may also be changed according to a gripping manner. In an embodiment, a physical distance between a component (for example, the AP) which generates the most heat in the electronic device 101 and a user's contact position with respect to the electronic device 101 may be closely related to a gripping manner, and a sensory temperature felt by the user may be changed according to the physical distance.

FIGS. 7A, 7B, 7C, and 7D are diagrams illustrating a distance from a processor according to a gripping manner in various embodiments.

Figure 7A:
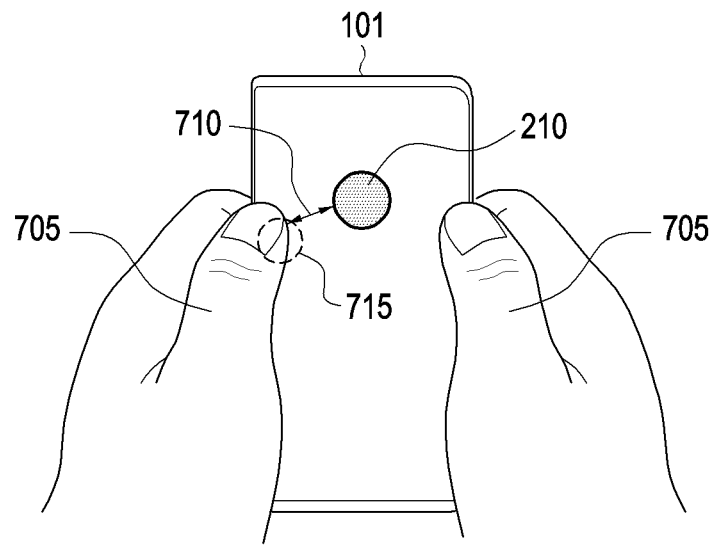
FIGS. 7A, 7B, 7C, and 7D are diagrams illustrating a distance from a processor according to a gripping manner in various embodiments.

Referring to FIG. 7A, in a case where the electronic device 101 operates in a portrait mode and both hands 705 of a user hold both side surfaces of the electronic device 101, a distance 710 between a position where the processor 210 is disposed in the electronic device 101 and a contact position 715 of the user is close, and heat generated by the processor 210 may be easily and directly propagated to the hands of the user.

Figure 7B:
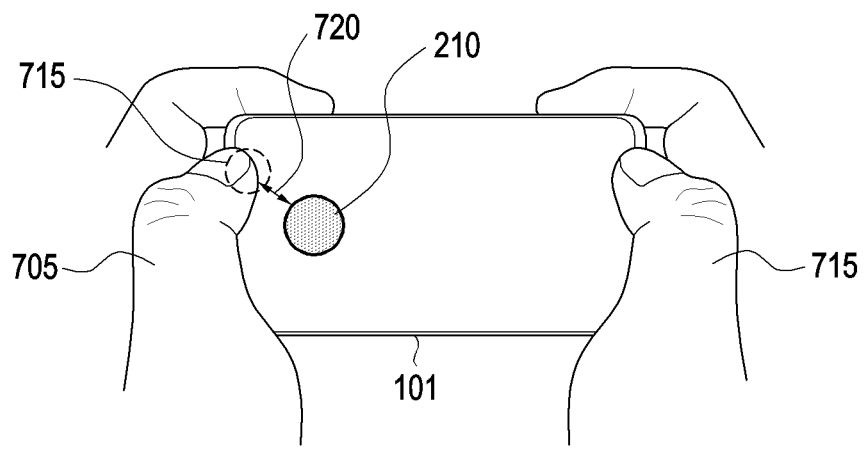

Referring to FIG. 7B, in a case where the electronic device 101 operates in a landscape mode and both hands 705 of a user hold both side surfaces of the electronic device 101, a distance 720 between the processor 210 and a contact position 715 of the user is close, and likewise, heat generated by the processor 210 may be easily and directly propagated to the hands 705 of the user.

In an embodiment, in a case where the gripping manner as shown in FIG. 7A or 7B is detected, since heat generated by the processor 210 may be quickly propagated directly to a user, the processor 210 may determine to use the clock level (e.g., maximum clock level) corresponding to the current temperature according to a temperature compensation algorithm.

Figure 7C:
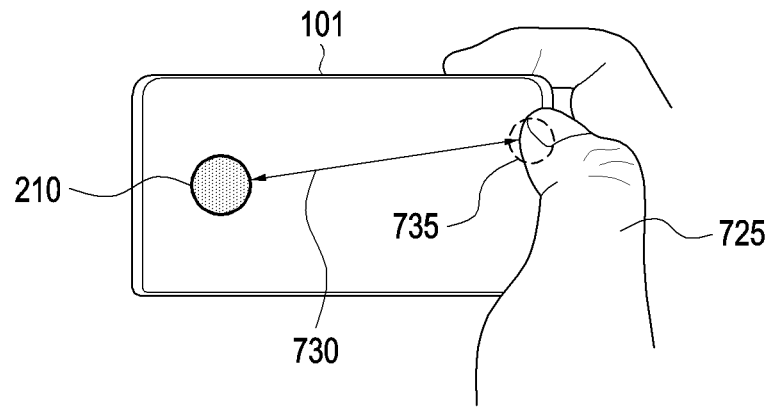

Referring to FIG. 7C, in a case where the electronic device 101 operates in a landscape mode and a hand 725 of a user holds one side surface of the electronic device 101, a distance 730 between the processor 210 and a contact position 735 of the user may be relatively long, and heat of the processor 210 is propagated on the surface of the electronic device 101, so that the user may feel a lower sensory temperature compared to the heat generated by the processor 210.

Figure 7D:
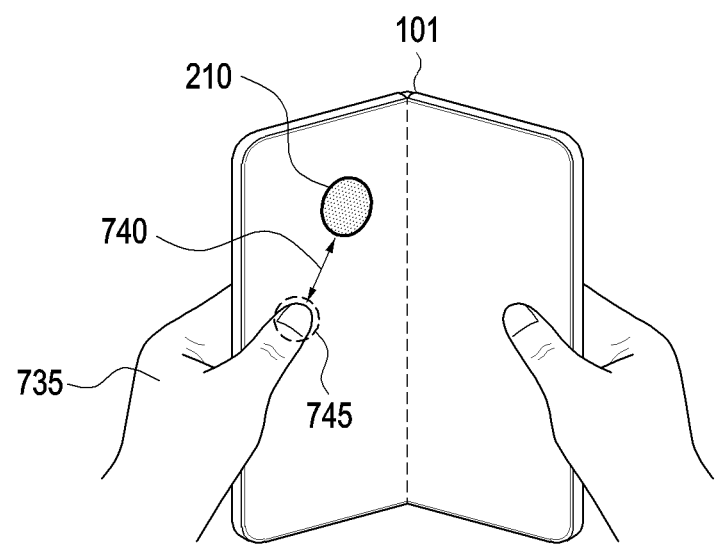

Referring to FIG. 7D, the electronic device 101 is a foldable device and the electronic device 101 is in an open state. In a case where the electronic device 101 in the open state operates in a landscape mode and both hands 735 of a user hold both side surfaces of the electronic device 101, a distance 740 between the processor 210 and a contact position 745 of the user may be relatively long, and the user may not be sensitive to heat of the processor 210.

In an embodiment, in a case where the gripping manner as shown in FIG. 7C or 7D is detected, the processor 210 may determine to use a clock level higher than the maximum clock level allowed at the current temperature according to the temperature compensation algorithm.

In various embodiments, the electronic device 101 generates the most heat in the periphery of the processor 210 (for example, an AP), and the degree of heating may decrease as a distance from the processor 210 increases.

Since a position of the processor 210 (for example, the AP) is fixedly determined from the time of designing the electronic device 101, the processor 210 may detect an operation mode (for example, one of a landscape mode, a portrait mode, a landscape reverse mode, and a portrait reverse mode) of the electronic device 101 and a user's gripping manner (for example, a distance between the processor 101 and a user's contact position) through a third sensor (for example, a grip sensor and an acceleration sensor), and differentially apply the temperature compensation algorithm according to the user's gripping manner and operation mode.

The following <Table 3> shows an example of a temperature compensation algorithm according to a distance between a position where the processor 210 (for example, the AP) is disposed and a user's contact position.

TABLE 3

| Distance from AP | Temperature threshold value |
| --- | --- |
| 0~25% | 70° C. |
| 26~50% | 75° C. |
| 51~75% | 80° C. |
| 76~100% | 85° C. |

In an embodiment, the processor 210 (for example, the AP) may determine to apply a temperature compensation algorithm by applying different temperature threshold values according to a distance between the processor 210 (for example, the AP) and a user's contact position. The maximum distance between the processor 210 (for example, the AP) and the user's contact position may be fixedly determined according to the shape of the electronic device 101. In an embodiment, in a case where the electronic device 101 is used without being held by a user (for example, in a case of being placed on a desk or a cradle), a distance between the processor 210 (for example, the AP) and the user's contact position may be regarded as the maximum distance. In an embodiment, the processor 210 may divide a ratio corresponding to the maximum distance into a plurality of sections, for example, four sections such as 0 to 25%, 26 to 50%, 51 to 75%, and 76 to 100%, and differentially determine a temperature threshold value for the temperature compensation algorithm according to a distance between each processor 210 (for example, the AP) and a user's contact position.

In an embodiment, in a case where a distance between the AP and a user's contact position is in a section of 26 to 50% of the maximum distance, the temperature threshold value for the temperature compensation algorithm may be determined to be 75 degrees, and when the current temperature detected by the temperature sensor 220 exceeds 75 degrees, the processor 210 may determine to decrease the current clock level by a given value (or a given ratio) or to use a clock level corresponding to the current temperature. In an embodiment, in a case where a distance between the AP and a user's contact position is in a section of 76 to 100% of the maximum distance, the temperature threshold value for the temperature compensation algorithm may be determined to be 85 degrees, and when the current temperature detected by the temperature sensor 220 exceeds 85 degrees, the processor 210 may determine to decrease the current clock level by a given value (or a given ratio) or to use a clock level corresponding to the current temperature. In various embodiments, since a temperature threshold value increases as a distance between the AP and a user's contact position increases, the user may use the electronic device 101 with better processing performance.

Figure 8:
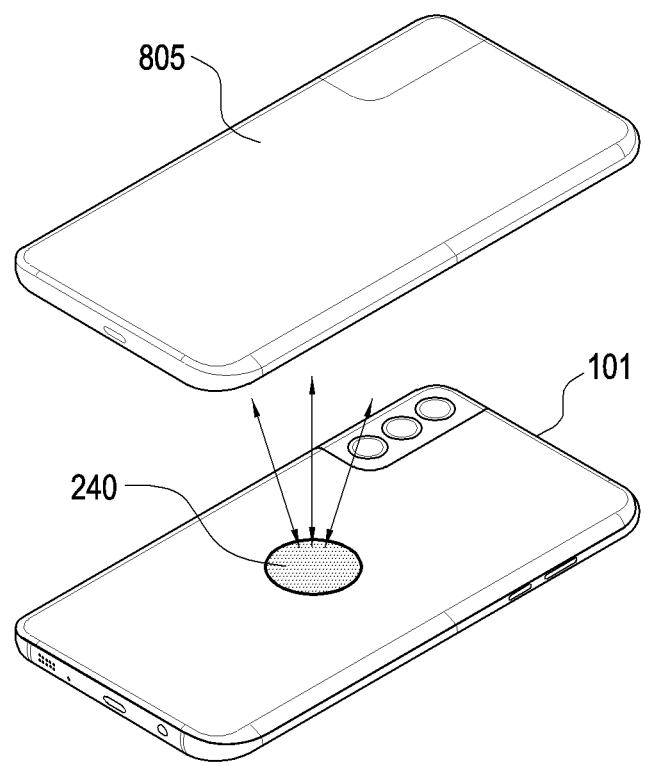
FIG. 8 is a diagram illustrating an operation of detecting mounting of a cover case according to various embodiments.

FIG. 8 is a diagram illustrating an operation of detecting mounting of a cover case according to various embodiments.

Referring to FIG. 8, the electronic device 101 may mount a cover case 805 for device protection or aesthetic reasons. In a case where the cover case 805 is mounted on the electronic device 101, the propagation of heat generated by an AP positioned at the back side of the electronic device 101 to a user's skin may be mitigated. The electronic device 101 may include a sensor (for example, the second sensor 240) which may detect whether the cover case 805 is mounted, and the processor 210 may determine whether the cover case 805 is mounted, based on information received from the second sensor 240, and use the same in a temperature compensation algorithm.

In an embodiment, the processor 210 may relax a temperature compensation condition (for example, a temperature threshold value) for executing a temperature compensation algorithm in a state in which the cover case 805 is mounted. In an embodiment, the processor 210 may use a higher temperature threshold value for the temperature compensation algorithm in a state in which the cover case 805 is mounted (referred to as a mounted state). According to an embodiment, a temperature threshold value for the temperature compensation algorithm in a state in which the cover case 805 is not mounted (referred to as an unmounted state) is, for example, 60 degrees, and when the current temperature exceeds 60 degrees, the processor 210 may determine to decrease the current clock level by a given value (or a given ratio) or to use a clock level corresponding to the current temperature. On the other hand, in the mounted state, the processor 210 may change the temperature threshold value for the temperature compensation algorithm to a higher value, for example, 65 degrees, compared to the unmounted state, and maintain the current clock level until the current temperature exceeds 65 degrees.

In various embodiments, at the time of using the electronic device 101, a 1 degree difference in a high temperature range may require temperature compensation for a longer period of time compared to a 1 degree difference in a low temperature range. For example, in a low temperature section of 30 to 31 degrees, the time until a temperature drops from 31 degrees to 30 degrees is short, but in a high temperature section of 80 to 81 degrees, it may require more time for a temperature to drop from 81 degrees to 80 degrees. Therefore, in a case where a clock level is limited according to the temperature compensation algorithm in the high temperature section, a user may experience processing performance degradation for a longer period of time. In various embodiments, by relaxing the clock level limitation (that is, increasing the maximum clock level) according to the characteristics (for example, a folding state, a state regarding whether a cover case is mounted, or a gripping manner) of the electronic device 101, a user may use the electronic device 101 without degradation in performance for a longer period of time.

In various embodiments, for example, in a case where a temperature compensation relaxation condition based on at least one of a flexible state (or a folding state) of the electronic device 101, a state regarding whether a cover case is mounted, or a gripping manner is not satisfied, the processor 210 may determine to use a clock level corresponding to the current temperature. In an embodiment, in a case where the temperature compensation relaxation condition is satisfied, the processor 210 may determine to use a clock level higher than the clock level corresponding to the current temperature. In an embodiment, the higher clock level may be a given value or may be determined by increasing the clock level corresponding to the current temperature by a given value (or a given ratio). In an embodiment, the higher clock level may be determined based on at least one of a flexible state (or a folding state) of the electronic device 101, a state regarding whether a cover case is mounted, or a gripping manner.

Figure 9:
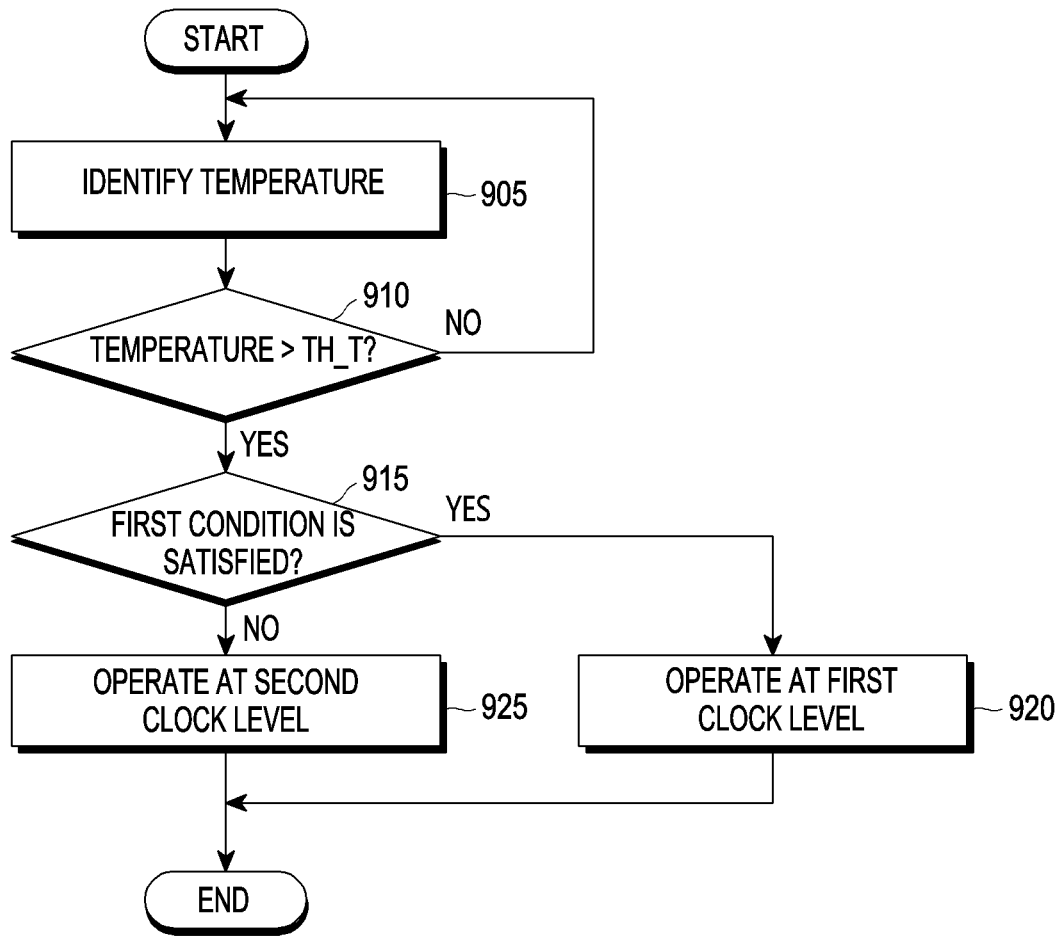
FIG. 9 is a flowchart illustrating an operation for temperature compensation according to various embodiments.

FIG. 9 is a flowchart illustrating an operation for temperature compensation according to various embodiments.

Referring to FIG. 9, in operation 905, the processor 210 may identify a temperature of the electronic device 101 from, for example, the temperature sensor 220. In an embodiment, the temperature may be a temperature of at least one component (for example, an AP and/or a battery) among the components included in the electronic device 101. In operation 910, the processor 210 may determine whether the identified temperature exceeds a temperature threshold value TH T given according to a temperature compensation algorithm. If the identified temperature does not exceed the temperature threshold value, the processor 210 may return to operation 905. If the identified temperature exceeds the temperature threshold value, the processor 210 may proceed to operation 915.

In operation 915, the processor 210 may determine whether a first condition (for example, a temperature compensation executing condition) according to the characteristics of the electronic device 101 is satisfied. In an embodiment, the first condition may be related to at least one of a flexible state (or a folding state) of the electronic device 101, a state regarding whether a cover case is mounted, or a gripping manner. In an embodiment, in a case where the electronic device 101 is a flexible device, the first condition may include a state in which the electronic device 101 is closed. In an embodiment, the first condition may include a state in which a cover case (for example, the cover case 805) is not mounted on the electronic device 101. In an embodiment, the first condition may include a state in which a distance between a user's contact position according to a manner of gripping the electronic device 101 and a position where an AP is disposed in the electronic device 101 does not exceed a given distance threshold value.

If the first condition is satisfied, the processor 210 may proceed to operation 920. In an embodiment, the processor 210 may proceed to operation 920 when the first condition is continuously satisfied for a specified time interval. If the first condition is not satisfied, the processor 210 may proceed to operation 925.

In operation 920, the processor 210 may determine to use a clock level corresponding to the identified temperature (hereinafter, referred to as a first clock level). In an embodiment, the first clock level may be a value determined according to a temperature compensation algorithm for heating control. In an embodiment, the processor 210 may read information on the first clock level from the memory 270, provide the information to the clock driving unit 260, and receive a clock signal having a clock speed of the first clock level according to the information from the clock driving unit 260. In an embodiment, the clock signal may be provided to a CPU and/or a GPU among a plurality of processing units included in the processor 210.

In operation 925, the processor 210 may determine to use a clock level higher than the first clock level (hereinafter referred to as a second clock level). In an embodiment, the processor 210 may read information on the second clock level from the memory 270, provide the information to the clock driving unit 260, and receive a clock signal having a clock speed of the second clock level according to the information from the clock driving unit 260. In an embodiment, the clock signal may be provided to the CPU and/or the GPU among the plurality of processing units included in the processor 210. In an embodiment, the second clock level may be a value corresponding to the identified temperature and higher than the first clock level. In an embodiment, the second clock level may be a value to which the temperature compensation algorithm for heating control is not applied.

Through the above operations, in a case where the first condition being related to at least one of a flexible state (or a folding state) of the electronic device 101, a state regarding whether a cover case is mounted, or a gripping manner is not satisfied, the processor 210 may determine to use a clock level higher than the clock level corresponding to the current temperature, thereby reducing degradation in processing performance.

The following <Table 4> shows examples of conditions for relaxing a temperature compensation condition of the electronic device 101.

TABLE 4

| Classification | Folding state | State regarding whether cover case is mounted | Gripping manner (distance from AP) |
|---|---|---|---|
| S1 | Closed | Unmounted | Close |
| S2 | | | Non-close |
| S3 | | Mounted | Close |
| S4 | | | Non-close |
| S5 | Open | Unmounted | Close |
| S6 | | | Non-close |
| S7 | | Mounted | Close |
| S8 | | | Non-close |

Referring to <Table 4>, the processor 210 may determine a plurality of conditions (for example, at least one of S1, S2, S3, S4, S5, S6, S7, or S8) according to whether a folding state of the electronic device 101 is a closed state or an open state, whether a state regarding whether a cover case is mounted with respect to the electronic device 101 is an unmounted state or a mounted state, and whether a distance between an AP and a user's contact position according to a gripping manner is close (for example, not exceeding a distance threshold value) or non-close (for example, exceeding a distance threshold value). In an embodiment, the first condition of operation 915 may include at least one of conditions S1 to S8 of <Table 4>.

In an embodiment, the first condition may include a state in which a folding state of the electronic device 101 is a closed state and a distance between a user's contact position and the AP is within a distance threshold value. In an embodiment, the first condition may include a state in which a folding state of the electronic device 101 is a closed state and the cover case is not mounted. In an embodiment, the first condition may include a state in which a distance between a user's contact position and the AP is within a distance threshold value and the cover case is not mounted. In addition, various other combinations may be possible.

In an embodiment, the first condition of operation 915 may include S1 of <Table 4>. S1 may include a state in which the electronic device 101 is in a closed state, the cover case is in an unmounted state, and a distance from the AP is close. In S1, heat of the electronic device 101 may be directly propagated to a user's body, and accordingly, the processor 210 may apply the first clock level according to the current temperature. On the other hand, in a case where the condition of S1 is not satisfied, the heat of the electronic device 101 may be propagated on the surface of the electronic device 101 or may be blocked by the cover case, and accordingly, the processor 210 may apply the second clock level higher than the first clock level according to the current temperature.

In an embodiment, the second clock level may be a clock level currently being used by the processor 210. In an embodiment, the second clock level may be a level having one or two steps higher than the first clock level based on <Table 1>. In an embodiment, the second clock level may be a clock level determined to correspond to the current condition of the electronic device 101, for example, one of S2 to S8.

Figure 10:
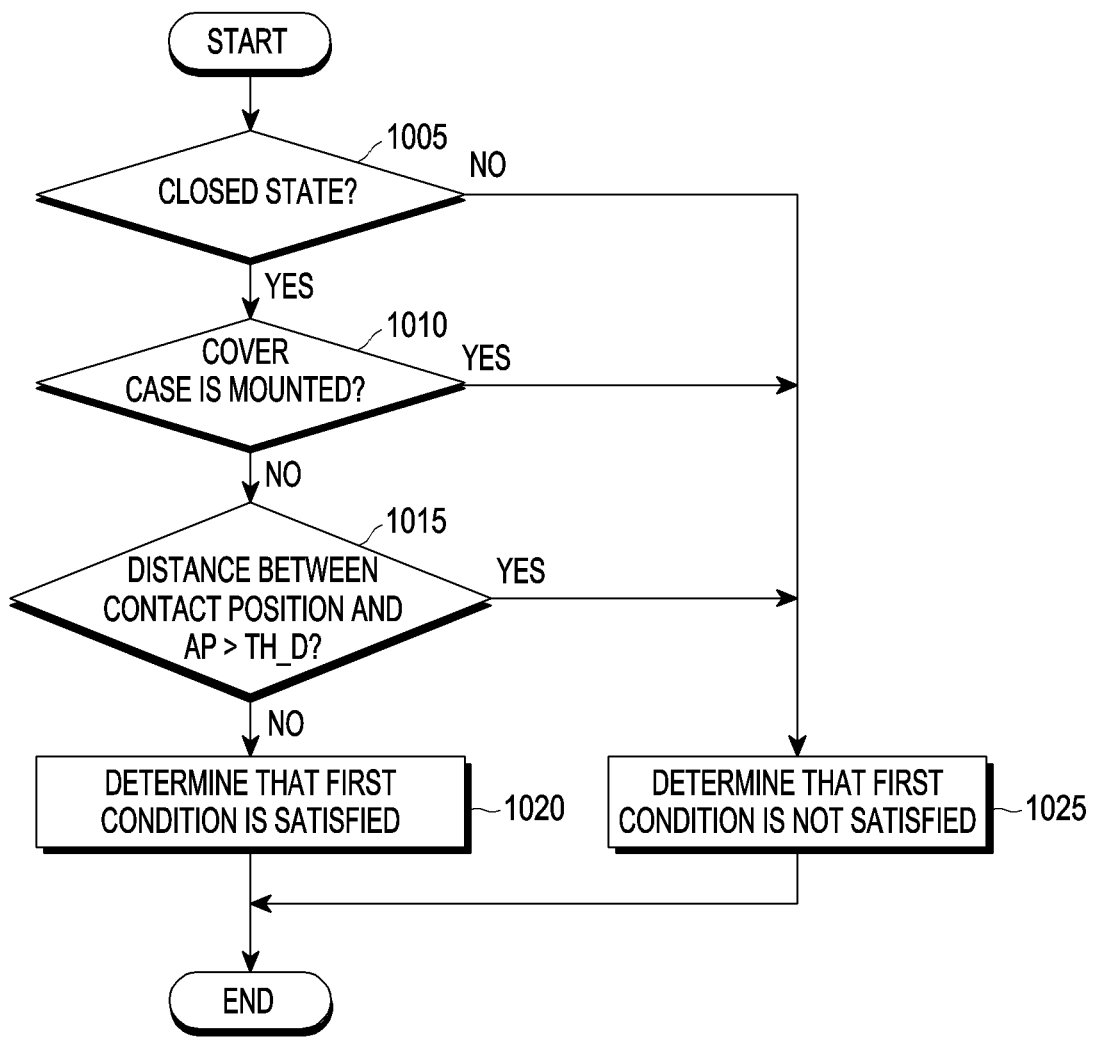
FIG. 10 is a flowchart illustrating an operation of determining a condition of an electronic device for temperature compensation according to various embodiments.

FIG. 10 is a flowchart illustrating an operation of determining a condition of the electronic device 101 for temperature compensation according to various embodiments. Operations to be described below in an embodiment may correspond to operation 915 of FIG. 9. In an embodiment, operation 915 may include at least one of the operations of FIG. 10.

Referring to FIG. 10, in operation 1005, in a case where the electronic device 101 is a flexible device, the processor 210 may determine whether the electronic device 101 is in a closed state, based on, for example, information provided from the first sensor 230. In a case where the electronic device 101 is not in a closed state, in other words, in an open state, the processor 210 may proceed to operation 1025 and determine that the first condition for executing the temperature compensation is not satisfied (that is, the temperature compensation condition is relaxed and a higher clock level is used, as in operation 925). In a case where the electronic device 101 is in a closed state, the processor 210 may proceed to operation 1010. In an embodiment, in a case where the electronic device 101 maintains a closed state for a specified time interval, the processor 210 may proceed to operation 1010.

In operation 1010, the processor 210 may determine whether a cover case (for example, the cover case 805) is mounted on the electronic device 101, based on, for example, information provided from the second sensor 240. In a case where the cover case 805 is mounted on the electronic device 101, in other words, in a mounted state, the processor 210 may proceed to operation 1025 and determine that the first condition for executing the temperature compensation is not satisfied (that is, the temperature compensation condition is relaxed and a higher clock level is used, as in operation 925). In a case where the cover case 805 is not mounted on the electronic device 101, in other words, in an unmounted state, the processor 210 may proceed to operation 1015. In an embodiment, in a case where the electronic device 101 maintains an unmounted state for a specified time interval, the processor 210 may proceed to operation 1015.

In operation 1015, the processor 210 may determine whether a distance between a user's contact position with respect to the electronic device 101 and the processor 210 (for example, an AP) exceeds a given distance threshold value TH D, based on, for example, information provided from the third sensor 250. In an embodiment, the information may include values detected by an acceleration sensor indicating whether an operation mode of the electronic device 101 is a landscape mode, a portrait mode, a landscape reverse mode, or a portrait reverse mode. In an embodiment, the information may include values detected by a grip sensor indicating a user's contact position with respect to the electronic device 101. In a case where the distance from the AP exceeds the distance threshold value, the processor 210 may proceed to operation 1025 and determine that the first condition for executing the temperature compensation is not satisfied (that is, the temperature compensation condition is relaxed and a higher clock level is used, as in operation 925). If the distance from the AP does not exceed the distance threshold value, the processor 210 may proceed to operation 1020. In an embodiment, the processor 210 may proceed to operation 1020 in a case where the distance from the AP maintains a state of exceeding the distance threshold value for a specified time interval.

In operation 1020, the processor 210 may determine that the first condition is satisfied, and proceed to operation 920 of FIG. 9.

Figure 11:
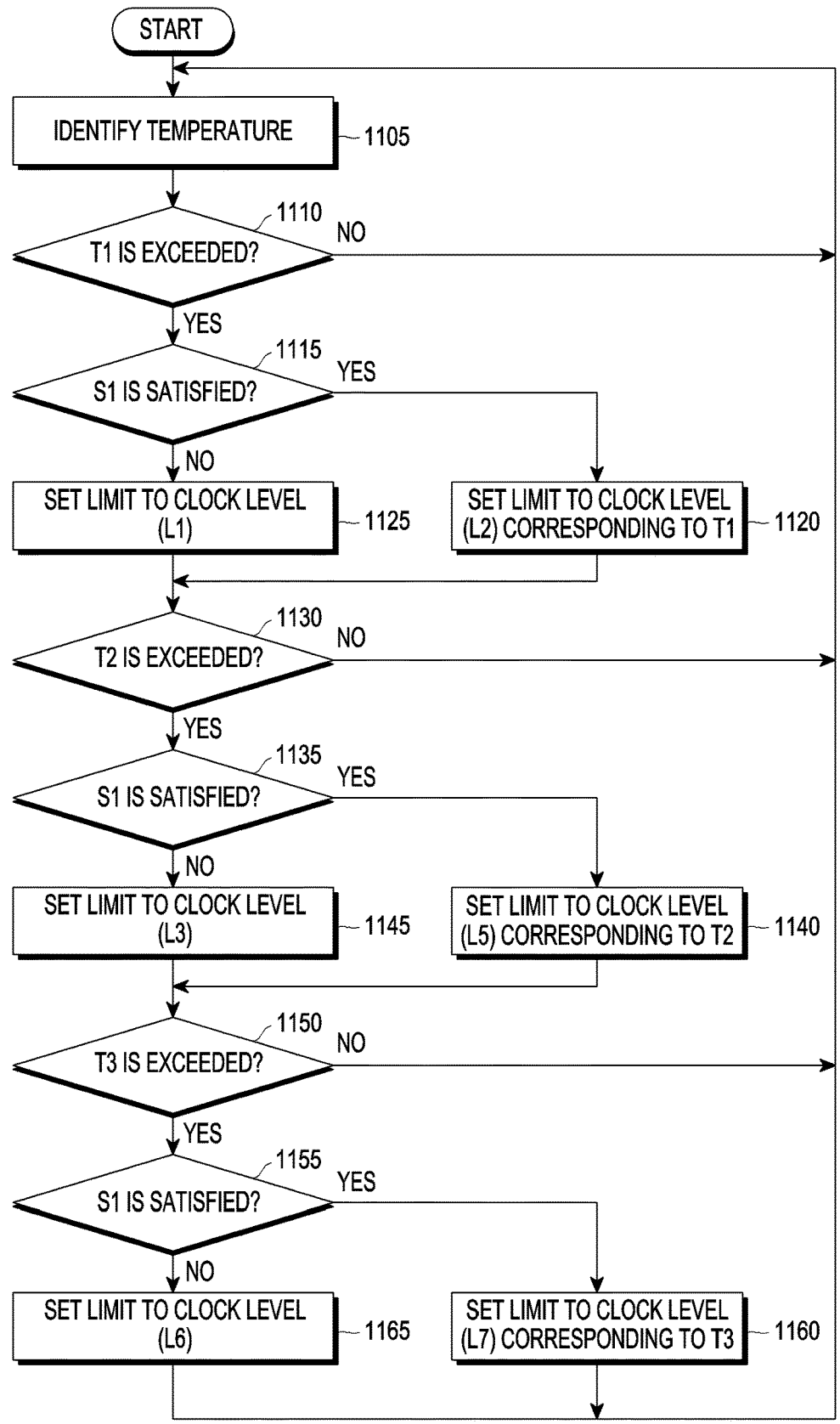
FIG. 11 is a flowchart illustrating another example of an operation of determining a condition of an electronic device for temperature compensation according to various embodiments.

FIG. 11 is a flowchart illustrating another example of an operation of determining a condition of the electronic device 101 for temperature compensation according to various embodiments. Operations to be described below in an embodiment may correspond to operation 915 of FIG. 9.

Referring to FIG. 11, in operation 1105, for example, the processor 210 may identify a temperature of the electronic device 101 from the temperature sensor 220. In an embodiment, the temperature may be a temperature of at least one component (for example, an AP and/or a battery) among the components included in the electronic device 101. In operation 1110, the processor 210 may determine whether the identified temperature exceeds a first temperature threshold value T1 (for example, 60 degrees) given according to a temperature compensation algorithm. If the identified temperature does not exceed the first temperature threshold value, the processor 210 may return to operation 1105. If the identified temperature exceeds the first temperature threshold value, the processor 210 may proceed to operation 1115.

In operation 1115, the processor 210 may determine whether a first condition (for example, a temperature compensation executing condition) according to the characteristics of the electronic device 101 is satisfied. In an embodiment, the first condition may be based on at least one of a flexible state (or a folding state) of the electronic device 101, a state regarding whether a cover case is mounted, or a gripping manner. In an embodiment, the first condition may include S1 shown in <Table 4>. In an embodiment, the first condition may include at least one condition and S1 shown in <Table 4>. If the first condition is satisfied, the processor 210 may proceed to operation 1120. If the first condition is not satisfied, the processor 210 may proceed to operation 1125.

In operation 1120, the processor 210 may determine to use a clock level corresponding to the first temperature threshold value (hereinafter referred to as a first clock level), for example, an L2 level (including 2.3 GHz for a CPU and 600 MHz for a GPU) as shown in <Table 1>. In an embodiment, the processor 210 may read information on the L2 level from the memory 270, provide the information to the clock driving unit 260, and receive a clock signal having a clock speed of the L2 level from the clock driving unit 260.

In operation 1125, the processor 210 may determine to use a clock level higher than the first clock level (hereinafter referred to as a second clock level), for example, an L1 level (including 2.5 GHz for a CPU and 700 MHz for a GPU) as shown in <Table 1>. In an embodiment, the processor 210 may read information on the L1 level from the memory 270, provide the information to the clock driving unit 260, and receive a clock signal having a clock speed of the L1 level according to the information from the clock driving unit 260. After operation 1120 or 1125, the processor 210 may proceed to operation 1130. In an embodiment, the second clock level may be determined to be higher than the first clock level by a given value A. In an embodiment, the second clock level may refer to a clock speed obtained by increasing the clock speed of the first clock level by a predetermined value.

In operation 1130, for example, the processor 210 may determine whether the temperature of the electronic device 101 detected by the temperature sensor 220 exceeds a second temperature threshold value T2 (for example, 70 degrees) given according to the temperature compensation algorithm. If the temperature does not exceed the second temperature threshold value, the processor 210 may return to operation 1105. If the identified temperature exceeds the second temperature threshold value, the processor 210 may proceed to operation 1135.

In operation 1135, the processor 210 may determine whether the above-described first condition is satisfied. In an embodiment, the first condition may include S1 shown in <Table 4> or may include at least one condition and S1 shown therein. In another embodiment not shown, in operation 1135, the processor 210 may determine a second condition different from the first condition of operation 1115. In an embodiment, the second condition may include at least one of the conditions shown in <Table 4>. If the first condition (or second condition) is satisfied, the processor 210 may proceed to operation 1140. If the first condition (or second condition) is not satisfied, the processor 210 may proceed to operation 1145.

In operation 1140, the processor 210 may determine to use a clock level corresponding to the second temperature threshold value (hereinafter referred to as a third clock level), for example, an L5 level (including 1.5 GHz for a CPU and 300 MHz for a GPU) as shown in <Table 1>. In an embodiment, the processor 210 may read information on the L5 level from the memory 270, provide the information to the clock driving unit 260, and receive a clock signal having a clock speed of the L5 level from the clock driving unit 260.

In operation 1145, the processor 210 may determine to use a clock level higher than the third clock level (hereinafter referred to as a fourth clock level), for example, an L3 level (including 2.0 GHz for a CPU and 500 MHz for a GPU) as shown in <Table 1>. In an embodiment, the processor 210 may read information on the L3 level from the memory 270, provide the information to the clock driving unit 260, and receive a clock signal having a clock speed of the L3 level according to the information from the clock driving unit 260. In an embodiment, the fourth clock level may be determined to be higher than the third clock level by a given value A. In an embodiment, the fourth clock level may refer to a clock speed obtained by increasing the clock speed of the third clock level by a predetermined value.

After operation 1140 or 1145, the processor 210 may proceed to operation 1150.

In operation 1150, for example, the processor 210 may determine whether the temperature of the electronic device 101 detected by the temperature sensor 220 exceeds a third temperature threshold value T3 (for example, 80 degrees) given according to the temperature compensation algorithm. If the temperature does not exceed the third temperature threshold value, the processor 210 may return to operation 1105. If the identified temperature exceeds the third temperature threshold value, the processor 210 may proceed to operation 1155.

In operation 1155, the processor 210 may determine whether the above-described first condition is satisfied. In an embodiment, the first condition may include S1 shown in <Table 4> or may include at least one condition and S1 shown therein. In another embodiment not shown, in operation 1155, the processor 210 may determine a third condition different from the first condition of operation 1115 or from the second condition of operation 1135. In an embodiment, the third condition may include at least one of the conditions shown in <Table 4>. If the first condition (or third condition) is satisfied, the processor 210 may proceed to operation 1160. If the first condition (or third condition) is not satisfied, the processor 210 may proceed to operation 1165.

In operation 1160, the processor 210 may determine to use a clock level corresponding to the third temperature threshold value (hereinafter referred to as a fifth clock level), for example, an L7 level (including 1 GHz for a CPU and 100 MHz for a GPU) as shown in <Table 1>. In an embodiment, the processor 210 may read information on the L7 level from the memory 270, provide the information to the clock driving unit 260, and receive a clock signal having a clock speed of the L7 level from the clock driving unit 260.

In operation 1165, the processor 210 may determine to use a clock level higher than the fifth clock level (hereinafter referred to as a sixth clock level), for example, an L5 level (including 1.5 GHz for a CPU and 300 MHz for a GPU) as shown in <Table 1>. In an embodiment, the processor 210 may read information on the L5 level from the memory 270, provide the information to the clock driving unit 260, and receive a clock signal having a clock speed of the L5 level according to the information from the clock driving unit 260. In an embodiment, the sixth clock level may be determined to be higher than the fifth clock level by a given value A. In an embodiment, the sixth clock level may refer to a clock speed obtained by increasing the clock speed of the fifth clock level by a predetermined value.

An operation method of an electronic device according to various embodiments may include operation 910 of determining that a temperature value detected by a temperature sensor included in the electronic device exceeds a first temperature threshold value; operation 915 of determining whether a condition is satisfied, the condition being related to at least one of a flexible state of the electronic device, whether a cover case is mounted on the electronic device, or a distance between a user's contact position with respect to the electronic device and a position at which the at least one processor is positioned in the electronic device; operation 920 of, based on the condition being satisfied, driving the at least one processor according to a first clock level corresponding to the temperature value for heating control; and operation 925 of, based on the condition not being satisfied, driving the at least one processor according to a second clock level higher than the first clock level.

In an embodiment, the condition may include at least one of a condition that the electronic device is a flexible device and the electronic device is in a closed state, a condition that the cover case is not mounted on the electronic device, or a condition that the distance is within a distance threshold value.

In an embodiment, the condition may include a condition that the electronic device is a flexible device and is in a closed state, the cover case is not mounted on the electronic device, and the distance is within a distance threshold value.

In an embodiment, the first clock level may be one of a plurality of clock levels configured for a central processing unit (CPU) and/or a graphic processing unit (GPU) included in the electronic device.

In an embodiment, the second clock level may be one of the plurality of clock levels configured for the central processing unit (CPU) and/or the graphic processing unit (GPU) included in the electronic device.

In an embodiment, the second clock level may be greater than the first clock level by a given value.

In an embodiment, the detected temperature value may include at least one temperature value measured for an application processor (AP) and/or a battery included in the electronic device.

In an embodiment, the method may further comprises determining a second temperature threshold value based on the distance between the user's contact position and the position at which the at least one processor is positioned in the electronic device, and based on the condition being satisfied, and further based on the temperature value detected by the temperature sensor exceeding the second temperature threshold value, driving the at least one processor according to the first clock level corresponding to the temperature value.

In an embodiment, the method may further include an operation of receiving information related to the condition from a sensor unit included in the electronic device, wherein the sensor unit includes at least one of: a first sensor configured to detect whether a flexible state of the electronic device is a closed state or an open state; a second sensor configured to detect whether the cover case is in a mounted state or an unmounted state with respect to the electronic device (e.g., whether the cover case is mounted on the electronic device or not); or a third sensor configured to detect the distance between the user's contact position and the position at which the at least one processor is positioned in the electronic device.

In an embodiment, the electronic device is a foldable device, and the flexible state may be one of a folded state and an unfolded state. In an embodiment, the electronic device is a rollable device, and the flexible state may be one of a state in which an open area of a display screen of the electronic device is less than a first threshold value and a state in which the open area of the display screen exceeds a second threshold value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the inventive concept has been particularly shown and described with reference to example embodiments thereof, it will be understood that various changes in form and details may be made therein without departing from the spirit and scope of the following claims.

The invention claimed is:

1. An electronic device comprising:
a temperature sensor;
at least one processor; and
memory storing instructions that, when executed by the at least one processor individually or collectively, cause the electronic device to:
  determine a distance between a user's contact position with respect to the electronic device and a position at which the at least one processor is positioned in the electronic device;
  adjust a first temperature threshold value based on the determined distance, wherein the first temperature threshold value is lower according to a decrease in the determined distance and higher according to an increase in the determined distance;
  based on a temperature value detected by the temperature sensor exceeding the adjusted first temperature threshold value, determine whether a condition is satisfied, the condition being related to at least one of a flexible state of the electronic device, or whether a cover case is mounted on the electronic device, or the distance between the user's contact position and the position at which the at least one processor is positioned;
  based on the condition being satisfied, operate according to a first clock level corresponding to the temperature value for heating control; and
  based on the condition not being satisfied, operate according to a second clock level higher than the first clock level,
wherein the instructions, when executed by the at least one processor individually or collectively, cause the electronic device to, after operating according to the first clock level or the second clock level:
  identify that the temperature value detected by the temperature sensor exceeds a second temperature threshold value, which is greater than the first temperature threshold value;
  based on the condition being satisfied, operate according to a third clock level corresponding to the temperature value exceeding the second temperature threshold value, the third clock level being lower than the first clock level.

2. The electronic device of claim 1, wherein the condition comprises at least one of a condition that the electronic device is a flexible device and the electronic device is in a closed state as the flexible state, a condition that the cover case is not mounted on the electronic device, or a condition that the determined distance is within a distance threshold value.

3. The electronic device of claim 1, wherein the first clock level is one of a plurality of clock levels configured for a central processing unit (CPU) and/or a graphic processing unit (GPU) included in the electronic device.

4. The electronic device of claim 1, wherein the second clock level is one of a plurality of clock levels configured for a CPU and/or a GPU included in the electronic device.

5. The electronic device of claim 1, wherein the second clock level is greater than the first clock level by a given value.

6. The electronic device of claim 1, wherein the detected temperature value comprises at least one temperature value measured for an application processor (AP) and/or a battery included in the electronic device.

7. The electronic device of claim 1, wherein the instructions, when executed by the at least one processor individually or collectively, cause the electronic device to, after operating according to the first clock level or the second clock level and identifying that the temperature value detected by the temperature sensor exceeds the second temperature threshold value:
  based on the condition not being satisfied, operate according to a fourth clock level higher than the third clock level, the fourth clock level being lower than the first clock level.

8. The electronic device of claim 1, further comprising a sensor unit including at least one of:
  a first sensor configured to detect whether the flexible state of the electronic device is a closed state or an open state;
  a second sensor configured to detect whether the cover case is mounted on the electronic device; or
  a third sensor configured to detect the distance between the user's contact position and the position at which the at least one processor is positioned in the electronic device.

9. The electronic device of claim 1, wherein the electronic device is a foldable device and the flexible state is one of a folded state and an unfolded state, or wherein the electronic device is a rollable device, and the flexible state is one of a state in which an open area of a display screen of the electronic device is less than a first threshold value and a state in which the open area of the display screen exceeds a second threshold value.

10. A method of operating an electronic device, the method comprising:
  determining a distance between a user's contact position with respect to the electronic device and a position at which at least one processor is positioned in the electronic device;
  adjusting a first temperature threshold value, based on the determined distance wherein the first temperature threshold value is lower according to a decrease in the determined distance and higher according to an increase in the determined distance;
  based on a temperature value detected by a temperature sensor exceeding the adjusted first temperature threshold value, determining whether a condition is satisfied, the condition being related to at least one of a flexible state of the electronic device, whether a cover case is mounted on the electronic device, or the distance between the user's contact position and the position at which the at least one processor is positioned;
  based on the condition being satisfied, driving the at least one processor according to a first clock level corresponding to the temperature value for heating control;
  based on the condition not being satisfied, driving the at least one processor according to a second clock level higher than the first clock level;
  after operating according to the first clock level or the second clock level, identifying that the temperature value detected by the temperature sensor exceeds a second temperature threshold value, which is greater than the first temperature threshold value; and based on the condition being satisfied, driving the at least one processor according to a third clock level corresponding to the temperature value exceeding the second temperature threshold value, the third clock level being lower than the first clock level.

11. The method of claim 10, wherein the condition comprises at least one of a condition that the electronic device is a flexible device and the electronic device is in a closed state as the flexible state, a condition that the cover case is not mounted on the electronic device, or a condition that the distance is within a distance threshold value.

12. The method of claim 10, wherein the condition comprises a condition that the electronic device is a flexible device and is in a closed state, the cover case is not mounted on the electronic device, and the distance is within a distance threshold value.

13. The method of claim 11, further comprising, after operating according to the first clock level or the second clock level and identifying that the temperature value detected by the temperature sensor exceeds the second temperature threshold value:

based on the condition not being satisfied, driving the at least one processor according to a fourth clock level higher than the third clock level, the fourth clock level being lower than the first clock level.

14. The method of claim 10, further comprising receiving information related to the condition from a sensor unit included in the electronic device, wherein the sensor unit comprises at least one of:

a first sensor configured to detect whether the flexible state of the electronic device is a closed state or an open state;

a second sensor configured to detect whether the cover case is mounted on the electronic device; or a third sensor configured to detect the distance between the user's contact position and the position at which the at least one processor is positioned in the electronic device.

15. The method of claim 10, wherein the first clock level is one of a plurality of clock levels configured for a central processing unit (CPU) and/or a graphic processing unit (GPU) included in the electronic device.

16. The method of claim 10, wherein the second clock level is one of a plurality of clock levels configured for a CPU and/or a GPU included in the electronic device.

17. The method of claim 10, wherein the second clock level is greater than the first clock level by a given value.

18. The method of claim 10, wherein the detected temperature value comprises at least one temperature value measured for an application processor (AP) and/or a battery included in the electronic device.

19. The method of claim 10, wherein the electronic device is a foldable device, and the flexible state is one of a folded state and an unfolded state, or the electronic device is a rollable device, and the flexible state is one of a state in which an open area of a display screen of the electronic device is less than a first threshold value and a state in which the open area of the display screen exceeds a second threshold value.

* * * * *